_United States Patent Office_

3,478,046
Patented Nov. 11, 1969

3,478,046
5-(OR 6)-HALO(OR AMINO)BENZAZOLES AND
METHODS FOR PREPARING SAME
Lewis H. Sarett, Princeton, and Horace D. Brown, Plainfield, N.J., assignors to Merck & Co., Inc., Rahway, N.J., a corporation of New Jersey
No Drawing. Continuation-in-part of application Ser. No. 332,940, Dec. 23, 1963. This application Apr. 10, 1967, Ser. No. 629,396
Int. Cl. C07d 95/00, 99/10, 99/06
U.S. Cl. 260—302
8 Claims

ABSTRACT OF THE DISCLOSURE

Anthelmintic 5- (or 6)-halo or amino substituted benzimidazoles, benzoxazoles, and benzothiazoles substituted at the 2-position with a 5- (or 6) membered heteromonocyclic radical having 1–3 hetero atoms selected from the group consisting of nitrogen, oxygen and sulfur, with optional substitution at the 1-position, are prepared by processes including treatment of an appropriately substituted o-phenylenediamine, o-aminophenol or o-aminothiophenol with a heterocyclic carboxylic acid or derivative thereof. It is contemplated that dosage units containing these benzazoles as the essential active ingrediant will be administered to animals in the treatment and control of anthelmintic infestations.

CROSS REFERENCES TO RELATED APPLICATIONS

This application is a continuation-in-part of our copending application Ser. No. 332,940, filed Dec. 23, 1963 and now abandoned, which application is in turn a continuation-in-part of our application Ser. No. 324,847, filed Nov. 19, 1963, and now abandoned.

BACKGROUND OF THE INVENTION

The invention relates to novel chemical compounds which are effective in controlling helminthiasis. The compounds herein described are 5- (or 6)-amino or halo substituted benzazoles which may be synthesized by one or more of the processes set forth in the description of the invention.

Helminthiasis is a common, widespread and serious disease, and available methods for the treatment and prevention of said disease have not been entirely satisfactory. Many compounds exist in the art which are useful as anthelmintics, but the search continues to find a compound or series of compounds which are not only active anthelmintics but which combine broad scope anthelmintic activity with relative ease of preparation.

According to the present invention, it has been found that certain benzimidazoles, benzoxazoles and benzothiazoles having at the 2-position a heteromonocyclic group containing either nitrogen, oxygen and/or sulfur as the hetero atom and having at the 5- (or 6)-position on the benzazole nucleus a halogen, amino, alkylamino or dialkylamino group, are active anthelmintics and that some of them have a surprising degree of activity against swine ascarids.

Among the helmintic parasites, the nematodes of the genera Haemonchus, Trichostrongylus, Ostertagia, Nematodirus, Cooperia, Bunostomum, Oesophagostomum, Chabertia, Trichuris, Ascaris, Capillaria, Heterakis and Ancylostoma are the most common parasites of domestic animals. The diseases attributable to such infections, such as ascariasis, trichostrongylosis and gross parasitism, are very widespread and serious, the diseased host usually suffering from such conditions as malnutrition, anemia and hemorrhaging. Moreover, more advanced and uncontrolled cases of helminthiasis can lead to prostration and death.

The compounds of this invention have a surprisingly high degree of activity against the parasitic roundworm, *Ascaris lumbricoides* var. *Suum*. The aforementioned ascarid presents a serious economic problem in swine production, and death, stunting or other permanent injury to the host are a common result of infection.

The adult worm inhabits the small intestines of the hog. The large number of eggs laid daily are passed out in the feces of the infected animal and continue to develop until ingested. The larvae then hatch, work their way to the blood stream, migrate to the liver, lungs and other organs and again find their way to the intestines where they mature. The liver and kidneys may show extensive changes because of the passage of the larvae through them.

By the present invention, a new class of compounds is provided which shows general anthelmintic activity but which is particularly effective against the roundworm *Ascaris lumbricoides* var. *Suum*.

SUMMARY

One object of the invention is to provide novel chemical compounds and methods for preparing anthelmintic compositions containing such compounds as an active ingredient. A further object of the invention is to provide a group of substituted benzimidazoles, benzoxazoles and benzothiazoles which are effective in controlling helminthiasis.

DESCRIPTION OF THE PREFERRED EMBODIMENTS

The novel compounds within the scope of this invention may be represented by the formula

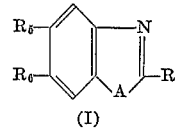

(I)

where R is a 5- (or 6)-membered heteromonocyclic radical containing from 1–3 hetero atoms wherein the hetero atoms are nitrogen, oxygen or sulfur; A is oxygen, sulfur or $NR_1$, where $R_1$ is hydrogen, loweralkyl, aralkyl, or acyl; and $R_5$ and $R_6$ are hydrogen, amino, loweralkylamino, diloweralkylamino or halo.

Certain of the new and novel compounds of this invention have an amino, alkylamino, or dialkylamino substituent at either the 5- or 6-position of the benzazole nucleus. In addition to the parent amino radical, this substituent may be a loweralkylamino radical such as methylamino, ethylamino, propylamino, butylamino, and the like, or it may be a diloweralkylamino radical such as dimethylamino, diethylamino, dipropylamino, methylethylamino, and the like. Other novel compounds of this invention have a halo radical at the 5- and/or 6-position on the benzazole nucleus. Thus it is possible to have either halogen or amino substitution at the 6-position, where the substituent at the 5-position is hydrogen. In the case of halogen substitution, however, it is possible to have disubstitution at both the 5- and 6-position. Therefore, the novel compounds may be 5-chlorobenzazoles, 5-bromobenzazoles, 5-fluorobenzazoles, 6 - fluorobenzazoles, 5,6-dichlorobenzazoles, 5,6-difluorobenzazoles, 5-chloro - 6 - fluorobenzazoles, 5 - dimethylaminobenzazoles, 6 - dimethylaminobenzazoles, 5 - aminobenzazoles, and the like.

In addition to having a substituent at the 5- and/or 6-position, the benzazoles of this invention also have a heterocyclic radical at the 2-position (R in formula I). It is preferred that this be a monocyclic heteroaromatic 5- or 6-membered ring that contains from 1–3 hetero atoms. The hetero atoms are oxygen, sulfur and/or nitrogen. Examples of such heterocyclic radicals are those containing only nitrogen such as pyrazinyl, pyrazolyl, pyridyl, and pyrryl, those containing oxygen such as furyl and pyronyl, those containing sulfur such as thienyl, and those containing two or more different hetero atoms such as isothiazolyl, isoxazolyl, oxazolyl, thiadiazolyl, thiapyronyl, and thiazolyl. The preferred compounds of the invention are those wherein 2-substituent contains nitrogen and sulfur as hetero atoms, e.g., thiazolyl, isothiazolyl, and thiadiazolyl.

At the 1-position of the benzimidazole nucleus there may be present alkyl, aralkyl or acyl radicals and the like. Among the alkyl radicals, lower alkyl such as methyl, ethyl, n-propyl and isopropyl are preferred whereas among the acyl radicals, alkanoyl radicals such acetyl and propionyl, aroyl radicals such as benzoyl and toluoyl, and aralkanoyl radicals such as phenacetyl are preferred. Benzyl is the preferred aralkyl radical which may be present at the 1-position.

When both nitrogen atoms on the benzimidazole nucleus are unsubstituted, one skilled in the art will appreciate that the hydrogen atom attached to one of the two nitrogen atoms in the ring will fluctuate between them creating a tautomeric molecule in which the 5- and 6-positions of the ring become equivalent. It is customary to describe these particular compounds as, for instance, a 5(6)-fluoro benzimidazole, a 5(6)-amino benzimidazole, or a 5(6)-dimethylamino benzimidazole.

As illustrative of the novel substituted benzimidazoles, benzoxazoles and benzothiazoles falling within the scope of our invention and which may be prepared according to the methods described hereinbelow, there may be mentioned 2(4'-thiazolyl)-5(6)-fluoro benzimidazole,
2-(4'H-4'-oxo-2'-pyranyl)-5(6)-fluoro benzimidazole,
2-(2'-thiazolyl)-5(6)-chloro benzimidazole,
2-(4'-oxazolyl-5(6)-fluoro benzimidazole,
2-(4'-isothiazolyl)-5(6)-fluoro benzimidazole,
2-(4'H-4'-oxo-2'-pyranyl-5(6)-chloro benzoxazole,
2-(3'-thienyl)-5,6-difluoro benzimidazole,
2-(4'-oxazolyl)-5(6)-chloro-benzoxazole,
2-(4'-thiazolyl)-5(6)-bromo benzimidazole,
2-(3'-isoxazolyl)-5(6)-chloro benzimidazole,
2-(4'-1,2,5-thiadiazolyl)-5-fluoro benzoxazole,
2-(4'H-4'-oxo-3'-thiapyranyl)-5(6)-fluoro benzimidazole,
2-(2'-pyrryl)-5,6-dichloro benzoxazole,
2-(4'-thiazolyl)-5(6)-bromo-benzoxazole,
1-acetyl-2-(3'-pyridyl)-5-fluoro benzimidazole,
2-(4'-isothiazolyl)-5(6)-chloro benzimidazole,
2-(2'-furyl)-6-fluoro benzothiazole,
2-(2'-pyrazinyl)-5(6)-chloro benzimidazole,
2-(2'-pyrazinyl)-5,6-difluoro-benzimidazole,
2-(2'-pyrazinyl)-5(6)-fluoro benzoxazole,
2-(4'-pyrazolyl)-5(6)-fluoro benzimidazole,
1-acetyl-2-(4'-pyrazolyl)-5-chloro benzimidazole,
2-(4'-pyrazolyl)-5(6)-fluoro benzoxazole,
2-(2'-furyl)-5(6)-dimethylamino benzimidazole,
2-(2'-thiazolyl)-5(6)-amino benzimidazole,
2-(2'-pyrryl)-5(6)-amino benzimidazole,
2-(2'-furyl)-5(6)-amino benzothiazole,
2-(2'-pyrazinyl)-5(6)-amino benzimidazole,
2-(2'thiazolyl)-5-dimethylamino benzoxazole,
2-(2'-(pyrazinyl)-5(6)-amino benzoxazole,
2-(3'-thienyl)-5-methylamino benzoxazole,
2-(4'-pyrazolyl)-5(6)-amino benzimidazole,
2-(2'-thiazolyl-5(6)-amino benzoxazole,
2-(4'-pyrazolyl)-5(6)-methylamino-bezimidazole,
1-benzoyl-2-(2'-thiazolyl)-5-dimethylamino-benzimidazole,
2-(4'H-4'-oxo-2'-pyranyl)-5(6)-ethylamino-benzimidazole,
2-(4'-thiazolyl)-5(6)-amino benzimidazole,
2-(4'H-4'-oxo-2'-pyranyl)-5(6)-diethylamino benzimidazole,
2-(2'-pyrazinyl)-5(6)-dimethylamino benzimidazole,
2-(4'-oxazolyl)-5(6)-amino benzimidazole,
2-(4'-oxazolyl)-5(6)-methylamino benzoxazole,
2-(3'-isoxazolyl)-5(6)-amino-benzimidazole,
2-(3'-isoxazolyl)-5(6)-butylamino benzimidazole,
2-(3'-isoxazolyl)-5(6)-amino benzoxazole,
2-(4'H-4'-oxo-3'-thiapyranyl)-5(6)-amino benzimidazole,
2-(4'H-4'-oxo-2'-pyranyl)-5(6)-amino benzimidazole,
and the like.

According to one process for the preparation of the compounds described by Formula I above and more specifically according to one process for the preparation of the benzimidazoles, such compounds may be prepared by reacting an appropriately substituted o-phenylendiamine, such as 2-amino-4-fluoroaniline, and a heterocyclic carboxylic acid or derivative thereof such as the acid halide, nitrile, ester or amide in a mineral acid such as sulfuric, phosphoric or hydrochloric acid. The process is carried out at temperatures of from about 120–180° C. for about 3–10 hours. The optimum time and temperature will, of course, depend to some extent upon the particular reactions involved. Benzene, toluene, xylene, and the like may be used as solvents for one or more of the reactants.

Equimolar amounts of the heterocyclic compound and the diamine are preferred, and from about 5–20 parts by weight of acid/part of heterocyclic compound is desired. It will be appreciated that the relative amount of acid is not critical. The desired benzimidazoles are recovered by cooling the reaction mixture and diluting it with water. Where the benzimidazoles do not readily crystallize after the above treatment, they are precipitated by treating the quenched mixture with a base.

According to another process for preparing the 5- or 6-substituted benzimidazoles of this invention, the novel compounds may be synthesized by reacting an appropriately substituted nitroaniline with a heterocyclic carboxylic acid or the corresponding ester or acid halide thereof, in a suitable inert solvent such as pyridine, benzene, and the like. The nitro group on the resulting anilide is then reduced and benzimidazole formation effected by treatment of said anilide with a reducing system such as zinc-hydrochloric acid, zinc-acetic acid, iron-hydrochloric acid and the like or by catalytic reduction.

The substituted benzimidazoles may also be synthesized by reacting an appropriately substituted o-phenylenediamine and a heterocyclic aldehyde such as thiazolyl-4-aldehyde, furyl-2-aldehyde and the like in a reaction medium comprising nitrobenzene. Good results are obtained by heating the reaction mixture to reflux temperature for a short period of time. If desired, a solvent such as a loweralkanol may be used to promote the solubility of the reactants at lower temperatures. Such solvents are allowed to distill off during the heating period. The substituted benzimidazoles in many cases crystallize directly on cooling the nitrobenzene solution. Alternatively, they may be crystallized by addition of ether or petroleum-ether.

According to a further embodiment of the invention, the novel benzimidazoles are prepared by condensation of a heterocyclic aldehyde such as 4H-4-oxo-thiapyran-2-aldehyde or pyrazine carboxaldehyde with an appropriately substituted o-phenylenediamine. The reaction is preferably brought about in a suitable solvent such as a lower alkanol. The intermediate product is the Schiff base of the aldehyde and the amine. Normally, this is not isolated but rather converted directly to the benzimidazole. The ring closure of the Schiff base to the benzimidazole is effected with a suitable oxidizing agent such as cupric acetate, lead tetraacetate, mercuric acetate, air, and the like. Where a heavy metal reagent is used to bring about benzimidazole formation from an o-phenylenediamine in the above process, an insoluble heavy metal salt of the 2-heterocyclic benzimidazole is formed. This material is readily converted to the free benzimidazole by removal of the heavy metal salt by reagents suitable to this purpose such as hydrogen sulfide, ammonium polysulfide, ammonium hydroxide and the like.

According to another process for making the benzimidazoles of the invention, an appropriately substituted aniline may be reacted with a heterocyclic nitrile in the presence of a suitable catalyst such as AlCl$_3$ to form an N-phenylamindine derivative of the heterocyclic compound. Treatment of this latter substance with hydroxylamine to produce an N'-phenyl-N-hydroxyamidine derivative and reaction of this latter substance with an alkyl or aryl sulfonyl halide and then a base will produce the benzimidazole.

Still another method of preparing the benzimidazoles of this invention is that process by which the N'-phenyl-amidine described in the preceding paragraph is chlorinated or brominated to produce an N-chloro or N-bromo-N'-phenylamidine. This halogenation is brought about by reacting said N'-phenylamidine with a positive halogenating agent capable of halogenating the nitrogen atom of the amidine group. Suitable reagents for this purpose are N-haloamides or N-haloimides, for instance, N-chlorosuccinimide, N-bromoacetamide and the like. When an N-haloamide or N-haloimide is used, a base in a sufficient amount to neutralize the acid addition salt of the N'-phenylamidine is employed. Suitable for this purpose is an alkali metal carbonate or hydroxide.

The preferred halogenating agents, however, are hypochlorous and hyprobromous acid. These are conveniently formed in situ by addition of an alkali or alkaline earth metal hypohalide to a solution of the N'-phenylamidine acid addition salt, whereby neutralization of the acid addition salt and generation of the halogenating agent occur concurrently. Typical hypohalites useful for this purpose are sodium or potassium hypochlorite, sodium hypobromite and calcium hypobromite.

The N-halo-N'-phenyl amidine resulting from the above halogenation is converted to the benzimidazole by treatment with a base, such as an alkali or alkaline earth metal hydroxide such as sodium hydroxide, potassium hydroxide or calcium hydroxide.

One method of obtaining a 1-substituted benzimidazole of Formula I above is by converting the 1-unsubstituted compound to an alkali metal salt, preferably the sodium salt, by intimately contacting said compound with sodium hydride in a suitable solvent. A slight molar excess of sodium hydride gives satisfactory results and equimolar quantities of benzimidazole and sodium hydride may also be used if desired. The reaction is conveniently brought about by warming the reactants at slightly elevated temperatures, but room temperature gives satisfactory results.

A 1-subsituted benzimidazole may then be obtained by contacting the benzimidazole alkali metal salt with an acyl halide such as benzoyl chloride, acetyl chloride, acetyl bromide, propionyl chloride and the like, an aralkyl halide such as benzyl chloride, or an alkyl halide, such as methyl chloride, ethyl chloride, methyl bromide and the like. Normally, the acyl halide, aralkyl halide or alkyl halide are added directly to a solution or suspension of the benzimidazole salt in an inert solvent and the reaction is allowed to proceed at a temperature of from about room temperature up to 100° C. Reaction temperatures in the range of 50–75° C. are preferred. The solvent employed as the reaction medium is preferably a hydrocarbon solvent such as benzene, toluene, xylene, petroleum ether and the like either alone or mixed with other solvents miscible therewith such as dimethylformamide. Where the 1-position on the benzimidazole is to be acylated, the reaction is carried out on a benzimidazole other than one of the 5(6)-amino substituted benzimidazoles.

When the benzimidazoles described herein are isolated as the freet bases, they are readily converted to acid addition salts by treatment with acid. Typical salts which may be formed in this minner are mineral acid salts such as the hydrohalides, e.g., hydrochloride, hydrobromide, hydroiodide, sulfates, nitrates, phosphates, and the like, aliphatic acid salts such as the acetate, trimethylacetate and propionate, salts of polycarboxylic acids such as the citrate, oxalate, succinate, and the like and salts of other insoluble organic acids such as the pamoate, lactate, embonate and hydroxynaphthoate salts. When the substituent in the 5(6)-position is amino or substituted amino, a diacid salt is formed, such as, for example, 5(6)-amino-2-(4'-thiazolyl)-benzimidazole dihydrochloride. Some of these salts are more water soluble and some less water soluble than the free base. It will be seen, therefore, that the solubility properties of a particular benzimidazole may be generally adjusted by judicious selection of a salt. When the benzimidazoles of this invention are used in salt form as anthelmintics, it is desirable that the particular acid employed be edible and non-toxic.

The 5- and 6-substituted benzoxazoles and benzothiazoles of this invention are obtainable in a variety of ways. One method comprises reaction of an appropriately substituted o-aminophenol or o-aminothiophenol with a heterocyclic carboxylic acid or derivative thereof, such as an acid halide, ester, amide or nitrile. Reaction is carried out by intimately contacting the two materials in substantially equimolar amounts at elevated temperatures. The benzoxazole or benzothiazole is obtained by mixing the reactants either in or in the absence of an organic solvent medium. Presence of a solvent is preferred. An aromatic hydrocarbon such as benzene, toluene or xylene is satisfactory for this purpose. The process is conveniently carried out at a temperature of from about 70°–120° C. When formation of the desired benzothiazole or benzoxazole is complete, the product may be isolated and purified by known methods such as by removal of the solvent under reduced pressure and either recrystallization or sublimation of the desired compound.

An additional method for making the benzoxazoles and benzothiazoles of the invention consists of the reaction of an appropriately substituted o-aminophenol or o-aminothiophenol with a heterocyclic carboxylic acid or a derivative thereof in a reaction medium comprising polyphosphoric acid. This process is particularly satisfactory for synthesizing the benzothiazoles and is preferably carried out by intimately contacting approximately equimolar amounts of the reactants in a medium comprising 5–20 parts by weight of polyphosphoric acid per part of carboxylic acid or its derivatives. The reaction is brought about by heating the mixture at temperatures of 150–215° C., preferably 180°–200° C., for 2–4 hours. The benzothiazoles are then isolated by quenching the cooled reaction mixture with water and neutralizing the acid with a base such a calcium carbonate, an alkali metal hydroxide or carbonate, or ammonium hydroxide. This method is considered less satisfactory for making the benzoxazole compounds than the one previously described inasmuch as said benzoxazoles are less stable in the presence of hot mineral acid than are the corresponding benzothiazoles.

Still another method for synthesizing the benzoxazoles and benzothiazoles of this invention comprises the reaction of an appropriately substituted o-aminophenol or o-aminothiophenol with a heterocyclic aldehyde in a solvent such as a loweralkanol. The reaction proceeds to form the corresponding benzoxazoline or benzothiazoline, this compound then being converted to the benzoxazole or benzothiazole by oxidation with ferric chloride, lead tetraacetate, cupric acetate, mercuric acetate, and the like.

The substiuted benzimidazoles, benzoxazoles and benzothiazoles described hereinabove are useful in the treatment and/or prevention of helminthiasis in domesticated animals. For this purpose they may be administered orally as a component of the animal feed stuff, in the drinking water, in salt blocks, and in unit dosage forms such as boluses and drenches. The amount of active ingredient required for optimum control of helminthiasis, of course, varies in accordance with such factors as the particular compound employed, the species of animal to be treated, the species of infecting parasite, the severity of infection, and whether the compound is employed therapeutically or prophylactically. Generally, certain classes of the compounds of this invention have activities differing from those in other classes. For instance, the benzimidazoles of this invention generally exhibit greater activity than the corresponding benzoxazoles and benzothiazoles. In general the compounds described herein when administered orally to domestic animals in daily doses of from about 0.1 mg. to about 500 mg. per kilogram of animal body weight are highly effective in controlling helminthiasis without intolerable toxic effect. When the compounds are to be employed as therapeutic agents, good results are obtained when the animals are fed a daily dose of from about 5 mg. to about 500 mg. and preferably 15 mg. to 250 mg. per kilogram of body weight. Administration may be in a single dose or divided into a plurality of smaller doses over a period of 24 hours. Where prophylactic treatment is desired and the compounds are fed continuously, satisfactory results are obtained when the animal's ingest daily dosages are from about 0.1 mg. to 100 mg. per kilogram of body weight.

The compounds of this invention, when prepared as a unit dosage form such as a capsule, tablet, bolus, drench and the like, may be blended with one or more innocuous orally ingestible ingredients including diluents, fillers, binders, lubricants, disintegrating agents, suspending agents, wetting agents and the like. Suspending agents are particularly valuable when a drench is desired and should be used in such amount as to pemit a uniform suspension of the active ingredient in water. Some suitable suspending agents which may be employed are bentonite, clays, water-soluble starches, cellulose derivatives, gums, surface active agents, and the like. The solid product is added to water just before administration. In the pre-drench formulation, in addition to the suspending agent, such ingredients as preservatives, antifoam compounds and the like may be employed. The exact quantity of suspending agent to be employed will depend upon the concentration of active anthelmintic ingredient and the particular suspending agent being utilized.

The unit dosage forms may be readily prepared by conventional formulating techniques and are particularly useful when administration is to be made in a single dose or divided doses over a period of 24 hours. In addition to the earlier mentioned ingredients, the solid compositions may also contain a material which when associated with the active ingredient maintains the active ingredient in inert or inoperative form so long as the composition remains in the acidic stomach, but which releases the active ingredient when the composition reaches the intestine. Such compositions, because enteric in character, are particularly useful for the treatment of animals suffering from severe helmintic infection of the intestinal tract. Provision of such enteric property can, for example, be accomplished by coating tablets and boluses in a conventional manner with one of the commonly employed enteric coatings such as those containing fatty acids, resins, waxes, synthetic polymers and the like.

The exact amount of active ingredient to be employed in the above compositions may vary provided that a sufficient amount is ingested to give the required dosage. In general, tablets, boluses and drenches containing from about 5 to 70% by weight of active ingredient may be satisfactorily employed to supply the desired dosage. Typical examples of boluses which may be used in accordance with the teaching of the invention are as follows:

Bolus—A

|  | Gm. |
|---|---|
| 5(6)-fluoro-2-(4'-thiazolyl)-benzimidazole | 6.0 |
| Dicalcium phosphate | 1.0 |
| Starch | 0.7 |
| Guar gum | 0.16 |
| Talc | 0.11 |
| Magnesium stearate | 0.028 |

Bolus—B

|  | Gm. |
|---|---|
| 2-(4'-thiazolyl)-5(6)-amino benzimidazole | 4.5 |
| Dicalcium phosphate | 0.8 |
| Starch | 0.55 |
| Guar gum | 0.12 |
| Talc | 0.08 |
| Magnesium stearate | 0.023 |

These boluses are prepared by thoroughly mixing the benzimidazole of the particle size smaller than 60 mesh with 0.43 gm. of starch in the form of an aqueous starch paste. The resulting mixture is then granulated in the usual manner, passed through a No. 10 mesh screen and dried at about 40°–500° C. for about 8 hours. The dried material is then passed through a No. 16 mesh screen after which the guar gum and the balance of the starch are added and the mixture thoroughly blended. The remainder of the ingredients are then added and the entire mass totally mixed. A bolus of the desired size is then prepared in a standard manner by means of compression.

Suitable drenches would contain the following ingredients in about an ounce of drench composition:

Drench—A

| 5(6)-amino-2-(4'-thiazolyl)-benzimidazole | gm | 4.5 |
|---|---|---|
| Benzalkonium chloride | ml | 0.6 |
| Antifoam emulsion | gm | 0.06 |
| Hyroxyethylcellulose | gm | 0.3 |
| Sodium phosphate monobasic | ml | 0.3 |
| Water | ml to | 30.0 |

Drench—B

| 2-(2'-furyl)-5(6)-dimethylamino benzimidazole | gm | 5.0 |
|---|---|---|
| Benzalkonium chloride | ml | 0.6 |
| Antifoam emulsion | gm | 0.06 |
| Hyroxyethylcellulose | gm | 0.3 |
| Sodium phosphate monobasic | gm | 0.6 |
| Water | ml to | 30.0 |

The levels of anthelmintic in these unit dosage forms may be varied within reasonable limits without altering the amounts of the other ingredients in the composition.

The benzimidazoles, benzoxazoles and benzothiazoles of this invention may be administered, dispersed in or admixed with the normal elements of animal sustenance, i.e., the feed, drinking water or other liquids normally partaken by the animals. This method is preferred when it is desired to administer the active compounds continuously, either as a therapeutic or prophylactic agent, for a period of several days or more. However, in such usage, it is to be understood that the present invention also contemplates the employment of compositions containing the active compounds intimately dispersed in or admixed with any other carrier or diluent which is inert with respect to the active ingredient, orally administrable and is tolerated by the animals. Such compositions may be utilized in the form of powders, pellets, suspensions and the like and are adapted to be fed to animals to supply the desired dosage or to be employed as concentrates or supplements and subsequently diluted with additional carried or feed to produce the ultimate composition. Examples of carriers or diluents suitable for such compositions are solid orally ingestible carriers such as distillers' dried grains, alfalfa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In the preparation of solid compositions the active ingredient is intimately dispersed or admixed throughout the feed or other solid carrier by methods such as grinding, stirring, milling or tumbling. By selecting proper diluents and by altering the ratio of carrier to active ingredient, compositions of any desired concentration may be prepared.

As previously stated, the 5- and 6-substituted benzazoles of the invention in general have an unusually high degree of activity against swine ascarids such as *Ascaris lumbricoides*. When anthelmintics such as those of the present invention are used for treating animals such as swine and particularly when the treatment is for the purpose of preventing or freeing the host from ascarid infestation, the active agents are preferably administered as an ingredient of the feed. Where the compounds described according to Formula I above are provided as a constituent of the feed, the required dosage may be supplied with feed compositions containing from about 0.001%–3% by weight of the active compound. Such medicated feed compositions can be prepared for direct use by mixing the above amount of active ingredient directly with the feed. The medicated feeds may also be prepared by the use of feed supplements containing higher concentrations of the active ingredient uniformly dispersed in a solid edible carrier such as mentioned above. The feed supplements may then be diluted with the feed to produce the desired concentration of active ingredient for feed. Since it is convenient for the feed manufacturer to use about one pound of feed supplement for each ton of finished feed, the preferred concentration of active ingredient in the feed supplement is partly a function of the level of active ingredient desired in the finished feed. In general, feed supplements containing from about 5% to about 50% by weight of active ingredients may be satisfactorily employed to supply the desired dosage in the finished feed.

Examples of typical feed supplements containing the active compounds dispersed in a solid inert carrier are:

| | Lbs. |
|---|---|
| 2-(4'-thiazolyl)-5(6)-fluoro benzimidazole | 5 |
| Wheat shorts | 95 |
| 2-(4'-thiazolyl)-5(6)-amino benzimidazole | 15 |
| Ground oyster shells | 40 |
| Citrus meal | 45 |
| 2-(2'-furyl)-5(6)-chloro benzimidazole | 25 |
| Corn meal | 75 |
| 2-(2'-thienyl)-5(6)-difluoro benzimidazole | 30 |
| Soybean mill feed | 70 |
| 2-(2'-thiazolyl)-6-fluoro benzimidazole | 15 |
| Molasses solubles | 85 |

In the preparation of these and similar feed supplements, the active ingredient is added to the carrier and the whole mixed to give substantially uniform dispersion of the anthelmintic agent in the carrier.

The following examples are given for the purpose of illustration and not by way of limitation.

Example 1.—2-(4'-thiazolyl)-5(6)-dimethylamino benzimidazole

A solution of 4.1 gm. (0.03 mole) of N,N-dimethyl-p-phenylenediamine in 50 ml. of toluene is added over a period of 30 minutes at room temperature to a solution of thiazole-4-carboxylic acid chloride, prepared by refluxing 3.9 gm. (0.03 mole) of thiazole-4-carboxylic acid and 3.3 ml. of thionyl chloride in 50 ml. of toluene. The solid that separates is filtered, washed with toluene, and dried; M.P. 181°–183° C.

A small sample is converted to the free base by dissolving it in water, adding an excess of potassium bicarbonate, and extracting the base with ether.

To a cold solution of 1.4 gm. (0.005 mole) of N-(p-dimethylamino)-4'-thiazolecarboxanilide hydrochloride in 5 ml. of sulfuric acid over a period of 4–5 minutes is added 0.2 ml. of (0.0044 mole) of fuming nitric acid in 2.5 ml. of sulfuric acid. After 10 minutes, the mixture is poured onto crushed ice. The ice is neutralized by the addition of potassium bicarbonate, and the maroon-colored solid which forms [N-(p-dimethylamino-o-nitro)-4'-thiazolecarboxanilide] is filtered, washed, and dried; M.P. 209°–210° C. After recrystallization from alcohol, the material melts at 210.5°–211° C.

A solution of 460 mg. (0.00157 mole) of N-(p-dimethylamino - o - nitro) - 4' - thiazolecarboxanilide and 0.2 ml. (0.002 mole) of concentrated hydrochloric acid in 100 ml. of methanol is reduced at room temperature at 40 p.s.i. with 0.2 gm. of 5% palladium over activated charcoal. The charcoal is removed by filtration, and the filtrate concentrated to dryness at reduced pressure. The residue is dissolved in a mixture of 12 ml. of ethanol, 11 ml. of water and 1.2 ml. of concentrated hydrochloric acid, and the solution refluxed for 4 hours. The excess acid is neutralized by the addition of ammonia water, and solid begins to crystallize. The mixture is chilled, and the tan-colored solid [2-(4'-thiazolyl)-5(6)-dimethylamino-benzimidazole] is filtered, washed, and dried; M.P. 231–234° C.

When in place of thiazole-4-carboxylic acid in the above process there is used isothiazole-4-carboxylic acid, 1,2,5-thiadiazole-4-carboxylic acid, 2-thenoic acid, pyrrole-2-carboxylic acid, pyrazine-2-carboxylic acid or oxazole-4-carboxylic acid, there is obtained 2-(4'-isothiazole-5(6)-dimethylamino benzimidazole, 2-(4'-1,2,5-thiadiazolyl)-5(6)-dimethylamino benzimidazole, 2-(2'-thienyl)-5(6)-dimethylamino benzimidazole, 2-(2'-pyrryl)-5(6)-dimethylamino benzimidazole, 2-(2'-pyrazinyl)-5(6) - dimethylamino benzimidazole, or 2-(4'-oxazolyl)-5(6)-dimethylamino benzimidazole, respectively.

Example 2.—2-(2'-furyl)-5(6)-fluoro benzimidazole

To 50 ml. of dry toluene is added 60 gm. of 2-nitro-4-fluoro aniline and 10 ml. of furoyl chloride. The red solution is heated at reflux for 1 hour. The solvent is removed under vacuum, benzene is added to the residue, then evaporated and added and evaporated once again. The remaining red solid is filtered and washed with n-butanol. The filtrate is diluted with ether giving about 1 gm. of a yellow hygroscopic solid which decomposes within a few minutes upon exposure to air; M.P. 113–117° C.

The anilide formed above is then reduced with a palladium over carbon catalyst and added to a mixture of 75 ml. of water, 75 ml. of ether alcohol and 10 ml. of HCl, and the solution is refluxed for 4 hours. The red solution is then charcoaled, filtered and the filtrate evaporated to ½ volume and neutralized with concentrated NH$_4$OH. The tan solid obtained after filtration has a melting point of 210°–214° C. Recrystallization from ethanol-water yields 2-(2'-furyl)-5(6)-fluoro benzimidazole, M.P. 220°–221° C.

When the above process is carried out using thiazole-4-carboxylic acid chloride or isoxazole-3-carboxylic acid chloride instead of furoyl chloride there is obtained 2-(4'-thiazolyl)-5(6)-fluoro benzimidazole or 2-(3'-isoxazolyl)-5(6)-fluoro benzimidazole, respectively.

When 2-nitro-4-aminoaniline is employed instead of 2-nitro-4-fluoroaniline in the above process, there are obtained 2-(2'-furyl)-5(6)-amino benzimidazole, 2-(4'-thiazolyl)-5(6)-fluoro benzimidazole, and 2-(3'-isoxazolyl)-5(6)-fluoro benzimidazole, respectively.

Example 3.—5-amino-2-(4'-thiazolyl)-benzimidazole

A solution of 65.5 gm. of cupric acetate monohydrate in 1200 ml. of water is warmed to about 60° C., and to this is added a solution of 15.8 gm. of 4-nitro-o-phenylenediamine in 1200 ml. of methanol in one portion. To the resulting solution is added with vigorous stirring a solution of 15.0 gm. of thiazole-4-carboxaldehyde in 225 ml. of methanol. The reaction mixture is heated at reflux for two hours after which it is cooled to room temperature and allowed to stand for 16 hours. The solid is filtered off, washed with water and suspended in 3800 ml. of 50% aqueous ethanol. Hydrogen sulfide is introduced into the stirred mixture for 2.5 hours during which period a precipitate of cupric sulfide appears. The mixture is heated to reflux and filtered while hot through Celite. The cake is washed with hot ethanol, and the washes are combined with the original filtrate. The crude product separates out of the filtrate on cooling and is collected by filtration, washed with water, and dried. After sublimation at reduced pressure and subsequent recrystallization from ethanol, 10.5 g. of pure 5-nitro-2-(4'-thiazolyl)-benzimidazole, M.P. 240–242° C. are obtained.

5.0 g. of 5-nitro-2-(4'-thiazolyl)-benzimidazole are dissolved in 610 ml. of absolute ethanol, and the solution is reduced catalytically over 2.0 g. of 5% palladium-on-carbon at 40 p.s.i. at room temperature. After the theoretical uptake of hydrogen is complete, the catalyst is removed by filtration and the solvent is evaporated in vacuo. Upon recrystallization of the solid residue from ethyl acetate, 3.7 g. of pure 5-amino-2-(4'-thiazolyl)-benzimidazole, M.P. 229–230° C., are obtained.

When the above process is repeated using pyrazine-2-carboxaldehyde and thiazole-2-carboxaldehyde in place of thiazole-4-carboxaldehyde, there are obtained 5-amino-2-(2'-pyrazinyl)-benzimidazole and 5-amino-2-(2'-thiazolyl)-benzimidazole, respectively.

Example 4.—2-(4'-thiazolyl)-5(6)-fluoro benzimidazole

A mixture of 1.0 gm. (0.01 mole) of p-fluoroaniline, 1.1 gm. (0.01 mole) of 4-cyanothiazole, 1.33 gm. (0.01 mole) of anhydrous aluminum chloride and 11 ml. of tetrachloroethane is stirred and refluxed for 20 minutes. The supernatant liquid is decanted; the residue is dissolved in 25 ml. of methanol and then added to 50 ml. of a 5 N solution of sodium hydroxide. 100 ml. of water are added and the mixture extracted with ether. On removal of the ether, this extract yields N-4'-fluorophenyl-(thiazole-4-amidine), M.P. 100°–102° C. Recrystallization from ethanol-water (1:2) produces a product which melts at 103.5°–104.5° C.

A suspension of 4.4 gm. of N-4'-fluorophenyl-(thiazole-4-amidine) in 25 ml. of methanol and 25 ml. of water is adjusted to pH 4.5 by the addition of concentrated hydrochloric acid. To the solution is added 7.3 ml. (1 equivalent) of 2.8 N sodium hypochlorite. After 3 minutes at room temperature a solution of 1 gm. of sodium hydroxide in 4 ml. of water is added. The mixture is refluxed for 10 minutes. A light-colored solid [2-(4'-thiazolyl)-5(6)-fluorobenzimidazole] appears which after being cooled is filtered, washed, and dried, having a melting point of 251°–253° C.

When the above process is repeated using 2-cyanopyrazine and 4-cyanopyrazole instead of 4-cyanothiazole, there are obtained 2-(2'-pyrazinyl)-5(6)-fluoro benzimidazole, respectively.

Example 5.—2-(4'-thiazolyl)-5,6-difluoro benzimidazole

A mixture of 5.2 gm. (0.04 mole) of 3,4-difluoroaniline, 4.4 gm. (0.04 mole) of 4-cyanothiazole and 5.4 gm. (0.04 mole) of anhydrous aluminum chloride in 50 ml. of tetrachloroethane is stirred and refluxed for 25 minutes and allowed to cool. The solvent is decanted and the dark residue is dissolved in 60 ml. of methanol and added to a stirred solution of 40 gm. of sodium hydroxide in 600 ml. of water. N-3,4-difluorophenyl-(thiazole-4-amidine), M.P. 116°–118° C., precipitates as the reaction product.

A mixture of 1.2 gm. of N-3,4-difluorophenyl-(thiazole-4-amidine) and 15 ml. of methanol is adjusted to pH 4.5 with concentrated hydrochloric acid. To this solution is added 3.2 ml. (1 equivalent) of 1.6 N sodium hypochlorite and the mixture is allowed to stand at room temperature for 3 minutes. A solution of 0.5 gm. of sodium carbonate in 12–15 ml. of water is added and the mixture is refluxed for 10 minutes. The mixture is cooled, more water added, and the product is filtered, washed and dried, giving 2-(4'-thiazolyl)-5,6-difluoro benzimidazole, M.P. 250° C.

When in the above process 4-methylamino aniline, 4-butylamino aniline and 4-dimethylamino aniline are used in place of 3,4-difluoro aniline, there are obtained 2-(4'-thiazolyl)-5(6)-methylamino benzimidazole, 2-(4'-thiazolyl)-5(6)-butylamino benzimidazole and 2-(4'-thiazolyl)-5(6)-dimethylamino benzimidazole, respectively.

Example 6.—2-(3'-thienyl)-5(6)-amino benzimidazole

A mixture of 1.08 gm. (.01 mole) of 4-aminoaniline, 1.09 gm. (.01 mole) of 3-cyanothiophene, 1.34 gm. (.01 mole) of anhydrous aluminum chloride and 15 ml. of tetrachloroethane is stirred and refluxed for 20 minutes. ml. of methanol. The methanol solution is added to a stirred solution of 15 gm. of sodium hydroxide in 250 ml. The reaction mixture is then cooled to room temperature, the solvent is decanted and the residue is dissolved in 30 ml. of water. The product N-4'-aminophenyl-(thiophene-3-amidine) precipitates and is collected by filtration.

A suspension of 2.27 gm. of N-4'-aminophenyl-(thiophene-3-amidine) in 10 ml. of methanol and 10 ml. of water is adjusted to pH 4.5 by the addition of concentrated hydrochloric acid. To this solution is added 3.5 ml. (1 equivalent) of 2.8 N sodium hypochlorite and the mixture is allowed to stand at room temperature for 3 minutes. A solution of 0.5 gm. of sodium carbonate in 15 ml. of water is added and the mixture is refluxed for 10 minutes, after which it is cooled to room temperature. About 25 ml. of water are added and the product, 2-(3'-thienyl)-5(6)-amino benzimidazole, is filtered, washed with water and dried.

When in the above process 4-cyanothiazole, 4-cyanopyrazine, 4-cyanooxazole and 2-cyanofuran are used in place of 3-cyanothiophene, there are obtained 2-(4'-thiazolyl)-5(6)-amino benzimidazole, 2-(4'-pyrazinyl)-5(6)-amino benzimidazole, and 2-(2'-furyl)-5(6)-amino benzimidazole, respectively.

Example 7.—2-(4'-thiazolyl)-5-fluoro benzoxazole

A solution of 2.5 gm. of 2-amino-4-fluorophenol in 30 ml. of pyridine is treated with thiazole-4-carboxylic acid chloride and heated over a steam bath for one half hour. The solution is then cooled, poured into water and extracted with benzene. The extract is washed with dilute hydrochloric acid and then water. Cooling and filtration give the intermediate anilide which is then suspended in 150 ml. of xylene. An equal amount of p-toluene sulfonic acid is then added. The mixture is refluxed for 5 hours, washed with 10% sodium bicarbonate, dried over magnesium sulfate, and evaporated to yield 2-(4'-thiazolyl)-5-fluoro benzoxazole.

When the above process is carried out using 2-amino-4-fluorothiophenol in place of 2-amino-4-fluorophenol, there is obtained 2-(4'-thiazolyl)-5-fluoro benzothiazole.

Example 8.—1-benzoyl-2-(4'-thiazolyl)-5(6)-fluoro benzimidazole

To 400 ml. of benzene and 175 ml. of dimethylformamide is added 20 gm. of 2-(4'-thiazolyl)-5(6)-fluorobenzimidazole and 3 gm. of sodium hydride. The sodium hydride is added as a 50% emulsion in oil mixed with 10 ml. of benzene. The addition is carried out slowly at 60° C., and stirring is conducted for 45 minutes after addition. Benzoyl chloride (14 g.) is then slowly added and the resulting mixture is heated for an additional 40 minutes at 60° C. The reaction mixture is then cooled to about 10° C., 15 ml. of water is added and the mixture is then washed with 5% sodium bicarbonate solution. The solution is then filtered and the filtrate is concentrated to dryness in vacuo. The residue is recrystallized from ethyl ether to give 1-benzoyl-2-(4'-thiazolyl)-5(6)-fluoro benzimidazole.

When methyl chloride, acetyl chloride or benzyl chloride is employed in the above process in place of benzoyl chloride, the resulting product will be 1-methyl-2-(4'-thiazolyl) - 5(6) - fluoro benzimidazole, 1-acetyl-2-(4'-thiazolyl)-5(6)-fluoro benzimidazole or 1-benzyl-2-(4'-thiazolyl)-5(6)-fluoro benzimidazole, respectively.

The general method for preparing benzimidazoles from N-phenylamidines by a process comprising chlorination of said amidine and treatment of the resulting N-halo-N'-phenylamidine with base, which method we employed in Examples 3–6 hereof, is the invention of our colleagues, Robert E. Jones and Victor J. Grenda, and is the subject matter of U.S. Ser. No. 315,677, filed by them on Oct. 11, 1963, now U.S. Patent No. 3,325,506.

It should be understood that although this invention has been described with reference to particular embodiments thereof, changes and modifications may be made which are within its intended scope.

What is claimed is:

1. A compound of the formula

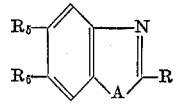

where R is a 5- or 6-membered heteromonocyclic radical pyrazinyl, pyrazolyl, pyridyl, pyrryl, furyl, pyronyl, thienyl, isothiazolyl, isoxazolyl, thiadiazolyl, thiapyronyl and thiazolyl; $R_5$ and $R_6$ are members of the group consisting of hydrogen, amino, loweralkylamino, and di-loweralkylamino, wherein one and only one of $R_5$ and $R_6$ is hydrogen; or halo, provided that at least one of $R_5$ and $R_6$ is halo; A is a member of the group consisting of oxygen, sulfur or $NR_1$, where $R_1$ is a member of the group consisting of hydrogen, loweralkyl, benzyl, loweralkanoyl, benzoyl, and phenacetyl; and nontoxic acid addition salts thereof.

2. The compound of claim 1 wherein R is thiazolyl, $R_5$ is halogen, $R_6$ is hydrogen, and A is $NR_1$, wherein $R_1$ is hydrogen.

3. The compound of claim 1 wherein R is 4'-thiazolyl, $R_5$ is fluoro, $R_6$ is hydrogen, and A is $NR_1$, wherein $R_1$ is hydrogen.

4. The compound of claim 1 wherein R is 4'-thiazolyl, $R_5$ is chloro, $R_6$ is hydrogen, and A is $NR_1$, wherein $R_1$ is hydrogen.

5. The compound of claim 1 wherein R is 2'-thiazolyl, $R_5$ is dimethylamino, $R_6$ is hydrogen, and A is $NR_1$, wherein $R_1$ is hydrogen.

6. The compound of claim 1 wherein R is 4'-thiazolyl, $R_5$ is dimethylamino, $R_6$ is hydrogen, and A is $NR_1$, wherein $R_1$ is hydrogen.

7. The compound of claim 1 wherein R is 4'-thiazolyl, $R_5$ is amino, $R_6$ is hydrogen, and A is $NR_1$, wherein $R_1$ is hydrogen.

8. The compound of claim 1 wherein R is 2'-thiazolyl, $R_5$ is amino, $R_6$ is hydrogen, and A is $NR_1$, wherein $R_1$ is hydrogen.

References Cited

UNITED STATES PATENTS

| | | | |
|---|---|---|---|
| 2,872,453 | 2/1959 | Jacob et al. | 167—55 |
| 2,945,030 | 7/1960 | Gordon | 167—55 |
| 3,017,415 | 1/1962 | Sarett et al. | 260—302 |
| 3,099,599 | 7/1963 | Copp et al. | 167—55 |

ALEX MAZEL, Primary Examiner

R. J. GALLAGHER, Assistant Examiner

U.S. Cl. X.R.

260—250, 294.8, 295, 296, 304, 307, 309.2, 575, 577, 578; 424—250, 263, 270, 272, 273

PO-1050
(5/69)

UNITED STATES PATENT OFFICE
CERTIFICATE OF CORRECTION

Patent No. __3,478,046__  Dated __November 11, 1969__

Inventor(s) __Lewis H. Sarett and Horace D. Brown__

It is certified that error appears in the above-identified patent and that said Letters Patent are hereby corrected as shown below:

Column 13: After "radical", line 44, and before, "pyrazinyl", line 45, insert the following phrase -- selected from the group consisting of --.

SIGNED AND
SEALED
APR 28 1970

(SEAL)
Attest:

Edward M. Fletcher, Jr.
Attesting Officer

WILLIAM E. SCHUYLER, JR.
Commissioner of Patents